US009485627B2

(12) United States Patent
David et al.

(10) Patent No.: US 9,485,627 B2
(45) Date of Patent: Nov. 1, 2016

(54) APPARATUS, SYSTEM AND METHOD OF ESTIMATING A LOCATION OF A MOBILE DEVICE

(71) Applicant: INTEL CORPORATION, Santa Clara, CA (US)

(72) Inventors: Moshe David, Bney Braq (IL); Itai Steiner, Tel Aviv (IL); Alex Orenov, Ashdod (IL); Kobi Kopelman, Tel Aviv (IL); Gaby Prechner, Rishon Lezion (IL)

(73) Assignee: INTEL CORPORATION, Santa Clara, CA (US)

( * ) Notice: Subject to any disclaimer, the term of this patent is extended or adjusted under 35 U.S.C. 154(b) by 114 days.

(21) Appl. No.: 14/492,033

(22) Filed: Sep. 21, 2014

(65) Prior Publication Data

US 2016/0088444 A1 Mar. 24, 2016

(51) Int. Cl.

*H04W 24/00* (2009.01)
*H04W 4/04* (2009.01)

(52) U.S. Cl.

CPC .................................. *H04W 4/043* (2013.01)

(58) Field of Classification Search

CPC .............................. H04W 64/00; H04W 4/02
USPC ........................ 455/456.1, 456.5, 457, 404.2
See application file for complete search history.

(56) References Cited

U.S. PATENT DOCUMENTS

2014/0315536 A1* 10/2014 Chow .................... H04W 8/18 455/419
2015/0045054 A1* 2/2015 Emadzadeh .......... H04W 4/043 455/456.1

* cited by examiner

*Primary Examiner* — Chuck Huynh
(74) *Attorney, Agent, or Firm* — Shichrur & Co.

(57) ABSTRACT

Some demonstrative embodiments include apparatuses, systems and/or methods of estimating a location of a mobile device. For example, an apparatus may include a radio to receive location information including locations of a plurality of detected access points; and a location estimator to select from the plurality of detected access points a plurality of selected access points, based on the location information, and to estimate a location of the mobile device based on communications from the plurality of selected access points.

24 Claims, 10 Drawing Sheets

APPARATUS, SYSTEM AND METHOD OF ESTIMATING A LOCATION OF A MOBILE DEVICE

TECHNICAL FIELD

Embodiments described herein generally relate to estimating a location of a mobile device.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

An estimated location of a station may be determined by calculating two or more distances between the station and two or more other stations, e.g., APs, by utilizing a location estimation method, e.g., a trilateration method.

The location estimation method may not provide location estimation with a desired accuracy, for example, if the two or more distances between the station and the two or more other stations do not have a desired accuracy.

The location estimation method may involve performing frequent wireless scanning, which may increase a power consumption of a mobile device and shorten a life of a battery of the mobile device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
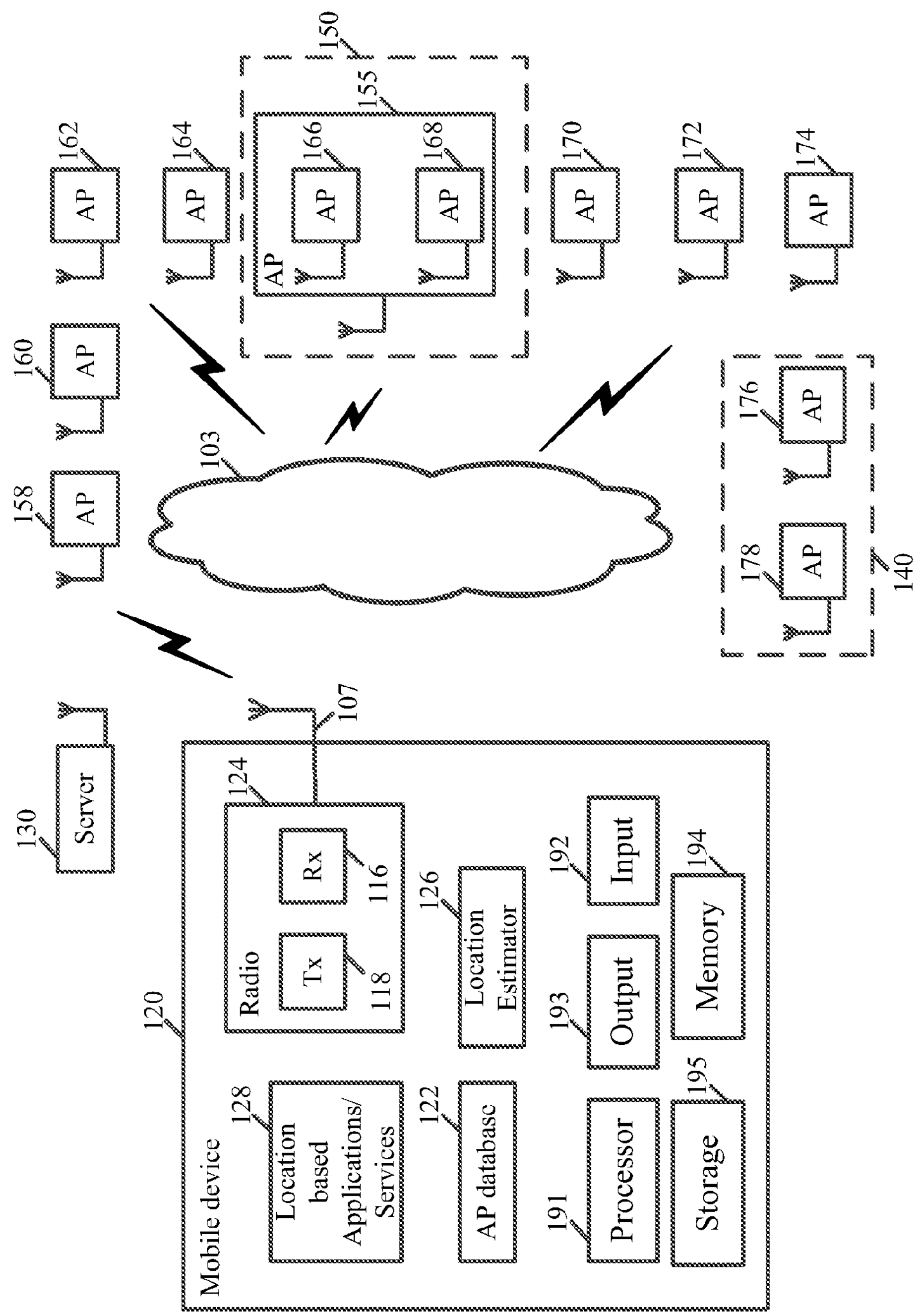
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE* 802.11-2012*, IEEE Standard for Information technology—Telecommunications and information exchange between systems Local and metropolitan area networks—Specific requirements Part* 11*: Wireless LAN Medium Access Control* (*MAC*) *and Physical Layer* (*PHY*) *Specifications*, Mar. 29, 2012*; IEEE*802.11*ac*-2013 (*IEEE Standard for Information Technology—Telecommunications and information exchange between systems Local and metropolitan area networks—Specific requirements Part* 11*: Wireless LAN Medium Access Control* (*MAC*) *and Physical Layer* (*PHY*) *Specifications—Amendment* 4*: Enhancements for Very High Throughput for Operation in Bands below* 6 *GHz*); IEEE 802.11*ad* (*IEEE P*802.11*ad*-2012*, IEEE Standard for Information Technology—Telecommunications and Information Exchange Between Systems—Local and Metropolitan Area Networks—Specific Requirements—Part* 11*: Wireless LAN Medium Access Control* (*MAC*) *and Physical Layer* (*PHY*) *Specifications—Amendment* 3*: Enhancements for Very High Throughput in the* 60 *GHz Band,* 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Open Mobile Alliance (OMA) standards, including the Secure User Plane Location (SUPL) protocol (SUPL-OMA-AD-SUPL-V2.0) and/or future versions and/or derivatives thereof, devices and/or networks operating in accordance with existing World-Wide-Web Consortium (W3C) standards, including the W3C Hypertext Markup Language (HTML) Version 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100, in accordance with some demonstrative embodiments.

As shown in FIG. 1, in some demonstrative embodiments, system 100 may include one or more mobile devices, e.g., a mobile device 120, capable of communicating with one or more access points (APs), e.g., an access point 160, an access point 162, an access point 164, an access point 166, an access point 168, an access point 170, an access point 172, an access point 174, an access point 176, and/or an access point 178.

In some demonstrative embodiments, mobile device 120 may include, for example, a User Equipment (UE), a mobile computer, a laptop computer, a notebook computer, a tablet computer, an Ultrabook™ computer, an Internet of Things (IoT) device, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, mobile device 120 may include, for example, a processor 191, an input unit 192, an output unit 193, a memory unit 194, and/or a storage unit 195. Mobile device 120 may optionally include other suitable hardware components and/or software components. In some demonstrative embodiments, some or all of the components of mobile device 120 may be enclosed in a common housing or packaging, and may be interconnected or operably associated using one or more wired or wireless links. In other embodiments, components of mobile device 120 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 120 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 120.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, mobile device 120 may be capable of communicating content, data, information and/or signals via a WM 103. In some demonstrative embodiments, WM 103 may include, for example, a radio channel, a cellular channel, a Global Navigation Satellite System (GNSS) Channel, an RF channel, a Wireless Fidelity (Wi-Fi) channel, an IR channel, a Bluetooth (BT) channel, and the like.

In some demonstrative embodiments, mobile device 120 may be configured to communicate with AP 160, AP 162, AP 164, AP 166, AP 168, AP 170, AP 172, AP 174, AP 176, and/or AP 178, for example, over a plurality of wireless communication bands. For example, mobile device 120, may communicate with AP 160, AP 162, AP 164, AP 166, AP 168, AP 170, AP 172, AP 174, AP 176, and/or AP 178 over one or more Wireless Local Area Network (WLAN) frequency bands, e.g., Wi-Fi frequency bands, and/or cellular bands.

In some demonstrative embodiments, the plurality of wireless communication bands may include wireless communication bands of one or more Radio Access Technologies (RATs), for example, one or more of a WLAN technology, a cellular technology, and the like.

In some demonstrative embodiments, mobile device 120 may include at least one radio 124 to perform wireless communication between mobile device 120 and one or more other wireless communication devices, e.g., AP 160, AP 162, AP 164, AP 166, AP 168, AP 170, AP 172, AP 174, AP 176, and/or AP 178.

In some demonstrative embodiments, radio 124 may include one or more wireless receivers (Rx) 116, able to receive wireless communication signals, RF signals, frames, blocks, transmission streams, packets, messages, data items, and/or data.

In some demonstrative embodiments, radio 124 may include one or more wireless transmitters (Tx) 118, able to send wireless communication signals, RF signals, frames, blocks, transmission streams, packets, messages, data items, and/or data.

In some demonstrative embodiments, radio 124 may include modulation elements, demodulation elements, amplifiers, analog to digital and digital to analog converters, filters, and/or the like. For example, radio 124 may include or may be implemented as part of a wireless Network Interface Card (NIC), and the like.

In some demonstrative embodiments, radio 124 may include, or may be associated with one or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, mobile device 120, AP 158, AP 160, AP 162, AP 164, AP 166, AP 168, AP 170, AP 172, AP 174, AP 176, and/or AP 178 may be located in an indoor environment, for example, a mall, a building, an office, and/or the like. In other embodiments, mobile device 120, AP 158, AP 160, AP 162, AP 164, AP 166, AP 168, AP 170, AP 172, AP 174, AP 176, and/or AP 178 may be located in any other environment, e.g., any other indoor and/or outdoor location.

In some demonstrative embodiments, mobile device 120 may include one or more location based Applications/Services 128 configured to use and/or process a location of mobile device 120.

For example, location based Applications/Services 128 may request the location of mobile device 120, for example, when mobile device 120 is located in the indoor environment.

In some demonstrative embodiments, mobile device 120 may be configured to estimate the location of mobile device 120 within the indoor environment, for example, based on a location estimation method, for example, a trilateration method, a statistical estimation via Kalman filter, and/or any other method.

For example, mobile device 120 may estimate the location of mobile device 120 within the indoor environment, e.g., based on a location of two or more APs in a vicinity of mobile device 120.

In some demonstrative embodiments, mobile device 120 may perform a wireless scanning to detect APs in the vicinity of mobile device 120.

In some demonstrative embodiments, mobile device 120 may detect a number, denoted $n_D$, of APs in the vicinity of mobile device 120.

For example, mobile device 120 may detect AP 158, AP 160, AP 162, AP 164, AP 166, AP 168, AP 170, AP 172, AP 174, AP 176, and/or AP 178, for example, when performing the wireless scanning.

In some demonstrative embodiments, mobile device 120 may estimate a distance between mobile device 120 and a set of APs, for example, to estimate the location of mobile device 120, e.g., using the location estimation method.

For example, mobile device 120 may estimate the location of mobile device 120, e.g., based on a number, denoted $n_M$, of APs required to estimate the location of mobile device 120, e.g., using the location estimation method.

In some demonstrative embodiments, mobile device 120 may select a number, denoted $n_S$, of APs from the $n_D$ detected APs to estimate the location of mobile device 120.

In one example, the number $n_S$ may be equal to the number $n_M$. In another example, the number $n_S$ may be greater than the number $n_M$, e.g., to estimate the location of mobile device 120 with increased precision. In another example, the number $n_S$ may be less than the number $n_M$, for example, if the number $n_D$ of detected APs is less than the number $n_M$.

In some demonstrative embodiments, mobile device 120 may not be able to estimate an exact and/or accurate location of mobile device 120, for example, if mobile device 120 selects a sub-optimal set of APs from the $n_D$ detected APs.

In one example, mobile device 120 may select the sub-optimal set of APs, e.g., if the APs are selected based only on Received Signal Strength Indication (RSSI) measurements. In one example, a RSSI of a remote AP may be relatively high, e.g., due to a high transmitter gain. In another example, a RSSI of a closest AP may be relatively high, e.g., due to a relatively short distance from mobile device 120. Accordingly, the RSSI measurement alone may not provide a sufficient parameter to determine an optimal set of APs to be used for estimating the location of mobile device 120.

In another example, mobile device 120 may select the sub-optimal set of APs, e.g., if the APs are selected based only on Time of Flight (ToF) measurements. For example, mobile device 120 may select the closest AP, e.g., based on the ToF measurements. Accordingly, the ToF measurement alone may not provide the sufficient parameter to determine the optimal set of APs to be used for estimating the exact location of mobile device 120.

In some demonstrative embodiments, mobile device 120 may perform frequent wireless scanning in order to update the location of mobile device 120. The frequent scanning may increase the power consumption of mobile device 120.

In some demonstrative embodiments, mobile device 120 may perform a frequent switching of radio 124 between different frequency channels, for example, if the detected APs operate over a large number of frequency channels. For example, the frequent switching of radio 124 between the frequency channels may increase the power consumption of mobile device 120.

In some demonstrative embodiments, selecting the sub-optimal set of APs may lead to determining an inexact location of mobile device 120, and/or increased power consumption of mobile device 120.

In some demonstrative embodiments, mobile device 120 may be configured to estimate the location of mobile device 120, for example, with decreased power consumption, and/or increased accuracy, e.g., as described below.

In some demonstrative embodiments, mobile device 120 may be configured to select a dynamic set of APs to estimate the location of mobile device 120, for example, with a high level of accuracy, e.g., as described below.

In some demonstrative embodiments, mobile device 120 may receive information corresponding to the $n_D$ detected APs, e.g., via radio 124.

In some demonstrative embodiments, mobile device 120 may receive communication information corresponding to the $n_D$ detected APs.

In some demonstrative embodiments, the communication information may correspond to one or more communication parameters of the $n_D$ detected APs.

For example, the communication parameters may include operating bandwidths (BWs) of the detected APs, position of control RF channels of the detected APs, RSSI of the detected APs, and/or the like.

In some demonstrative embodiments, mobile device 120 may receive the communication information of the detected APs during the wireless scanning.

In some demonstrative embodiments, mobile device 120 may receive the communication information from any other source.

In some demonstrative embodiments, mobile device 120 may receive location information corresponding to the $n_D$ detected APs, e.g., via radio 124.

In some demonstrative embodiments, the location information may include geodetic information of the $n_D$ detected APs.

For example, the geodetic information may include locations of the $n_D$ detected APs.

In some demonstrative embodiments, mobile device 120 may receive the geodetic information as a response to a Wi-Fi Location Configuration Information (LCI) request.

For example, mobile device 120 may send the Wi-Fi LCI request to a server 130.

In some demonstrative embodiments, mobile device 120 may receive the geodetic information from server 130, e.g., in the form of information blocks of APs.

In one example, mobile device 120 may receive from server 130 the geodetic information corresponding to a plurality of APs located in a predefined area in a vicinity of server 130. In another example, mobile device 120 may receive from server 130 the geodetic information corresponding to the $n_D$ detected APs.

In some demonstrative embodiments, mobile device 120 may receive the geodetic information from location based Applications/Services 128.

For example, mobile device 120 may receive from location based Applications/Services 128 the geodetic information corresponding to the plurality of APs located in a same area as mobile device 120.

In other demonstrative embodiments, mobile device 120 may receive the geodetic information from any other source.

In some demonstrative embodiments, mobile device 120 may determine metadata corresponding to the $n_D$ detected APs.

For example, the metadata of the $n_D$ detected APs may include counters of previous failed measurements corresponding to the $n_D$ detected APs.

In some demonstrative embodiments, mobile device 120 may include an AP database 122 configured to store information corresponding to the $n_D$ detected APs.

For example, AP database 122 may store the communication information, the location information, the metadata, and/or any other information corresponding to the $n_D$ detected APs, e.g., as described below.

In some demonstrative embodiments, AP database 122 may store the information corresponding to the $n_D$ detected APs in the form of a table.

For example, the AP database 122 table may include identifiers of the detected APs, addresses of the detected APs, the communication information, the location information, and/or the metadata corresponding to the detected APs.

In some demonstrative embodiments, AP database 122 may store the information corresponding to the $n_D$ detected APs in any other form.

In some demonstrative embodiments, mobile device 120 may determine to ignore an AP stored in AP database 122, for example, if mobile device 120 does not detect the AP during a recent wireless scanning.

For example, mobile device 120 may determine to ignore an AP 158 stored in AP database 122, for example, if mobile device 120 does not detect AP 158 during the recent wireless scanning.

In some demonstrative embodiments, mobile device 120 may include a location estimator 126 configured to select from the $n_D$ detected APs the $n_S$ selected APs, for example, based at least on the location information, e.g., as described below.

In some demonstrative embodiments, location estimator 126 may be configured to estimate the location of mobile device 120, e.g., based on communications with the $n_S$ selected APs.

For example, the communications with the $n_S$ selected APs may include RSSI measurements, ToF measurements, and/or any other communications, e.g., ranging communications.

In some demonstrative embodiments, location estimator 126 may eliminate one or more APs of the $n_D$ detected APs, e.g., which contribute the least to estimating the location of mobile device 120, e.g., as described below.

In some demonstrative embodiments, location estimator 126 may associate the plurality of detected APs with a plurality of AP clusters based on one or more criteria, e.g., as described below.

In some demonstrative embodiments, location estimator 126 may associate the plurality of detected APs with the plurality of AP clusters, e.g., based on addresses of the detected APs.

In some demonstrative embodiments, location estimator 126 may associate the plurality of detected APs with the plurality of AP clusters, for example, in order to reduce a number of the APs with multiple MAC addresses per same physical AP.

In some demonstrative embodiments, a physical AP may transmit on two or more bands. For example, a physical AP 155 may transmit on the 2.4 GHz band, and on the 5 GHz band. Physical AP 155 may perform the functionality of a plurality of virtual APs, e.g., AP 166 and AP 168.

In some demonstrative embodiments, a transmitting band of AP 155 may be detected as a band of a separate AP with a different MAC address. For example, mobile device 120 may detect AP 166, publishing a first MAC address, and AP 168, publishing a second MAC address, different from the first MAC address, e.g., while AP 166 and AP 168 may be virtual representations of AP 155.

In some demonstrative embodiments, location estimator 126 may associate AP 166 and AP 168 with an AP cluster 150.

In some demonstrative embodiments, location estimator 126 may associate the plurality of detected APs with the plurality of AP clusters, e.g., based on locations of the detected APs.

For example, AP 176 may be in close proximity to AP 178. According to this example, location estimator 126 may associate AP 176 and AP 178 with an AP cluster 140.

In other embodiments, location estimator 126 may associate the plurality of detected APs with the plurality of AP clusters based on any other criteria.

In some demonstrative embodiments, location estimator 126 may associate a detected AP with an AP cluster, e.g., based on a Basic Sequential Algorithm Scheme (BSAS), which may be configured to cluster proximate APs.

In some demonstrative embodiments, location estimator 126 may associate the detected AP with the AP cluster, e.g., based on statically binning a venue of the detected AP to physical parameters of a box of the detected AP, e.g., a box of predefined dimensions.

In other embodiments, location estimator 126 may associate the detected AP with the AP cluster based on any other clustering method.

In some demonstrative embodiments, location estimator 126 may determine a number, denoted $n_R$, of cluster-representative APs corresponding to the plurality of AP clusters, e.g., based on an operating BW, a quality of geodetic information, and/or any other criteria.

In one example, location estimator 126 may determine a representative of an AP cluster, e.g., based on the operating BW of the APs in the AP cluster. For example, location estimator 126 may determine AP 166 to be representative of AP cluster 150, for example, if AP 166 transmits on a higher band than AP 168.

In another example, location estimator 126 may determine the representative of the AP cluster, e.g., based on a quality of geodetic information. For example, location estimator 126 may determine AP 178 to be representative of AP cluster 140, for example, if location information of AP 178 is more precise than location information of AP 176.

In some demonstrative embodiments, location estimator 126 may select the $n_S$ selected APs from the $n_R$ cluster-representative APs.

In one example, the number $n_S$ of selected APs may be less than the number $n_R$ of cluster-representative APs.

In another example, the number $n_S$ of selected APs may be equal to the number $n_R$ of cluster-representative APs, for example, if the number $n_R$ of cluster-representative APs is less than the number $n_M$.

In some demonstrative embodiments, location estimator 126 may distribute the plurality of detected APs, or the plurality of cluster-representative APs, to a plurality of groups, e.g., corresponding to a respective plurality of location areas, or according to any other grouping criteria.

In some demonstrative embodiments, the plurality of location areas may include a plurality of floors of the indoor environment.

For example, location estimator 126 may distribute the $n_D$ detected APs, or the $n_R$ cluster-representative APs, by an affiliation to different floors, e.g., a floor above mobile device 120, a floor beneath mobile device 120, and/or a same floor as mobile device 120.

In some demonstrative embodiments, the plurality of location areas may correspond to a plurality of cardinal directions.

For example, location estimator 126 may distribute the $n_D$ detected APs, or the $n_R$ cluster-representative APs, by an affiliation to four cardinal directions with respect to mobile device 120, e.g., north from mobile device 120, south from mobile device 120, west from mobile device 120, and/or east from mobile device 120.

In some demonstrative embodiments, location estimator 126 may select the $n_S$ selected APs based on the plurality of groups, e.g., as described below.

In some demonstrative embodiments, location estimator 126 may prioritize the APs of a group located within the same floor as mobile device 120, for example, if the floor of mobile device 120 is known.

In some demonstrative embodiments, location estimator 126 may prioritize between APs of a group, e.g., based on the location of mobile device 120 relative to locations of the APs of the group.

For example, location estimator 126 may prioritize between the APs of the group, for example, by assigning a high priority to an AP at a shortest distance from mobile device 120, for example, if a general location of mobile device 120 is known.

In some demonstrative embodiments, location estimator 126 may prioritize between the APs of the group, e.g., based on a received signal strength from the APs of the group.

For example, location estimator 126 may prioritize between the APs of the group by a strongest RSSI received by mobile device 120, for example, if the general location of mobile device 120 is not known, or is not relatively precise.

In some demonstrative embodiments, location estimator 126 may select a number, denoted $n_C$, of candidate APs from the $n_D$ detected APs, e.g., as described below.

In some demonstrative embodiments, location estimator 126 may select the $n_S$ selected APs from the $n_C$ candidate APs, e.g., as described below.

In one example, the number $n_S$ of selected APs may be less than the number $n_C$ of candidate APs.

In another example, the number $n_S$ of selected APs may be equal to the number $n_C$ of candidate APs.

In some demonstrative embodiments, the number $n_C$ of candidate APs may be determined as follows:

$$n_C=\min(\text{sizeof}(n_P),n_M+K) \quad (1)$$

wherein $n_P$ denotes a plurality of potential APs, and K denotes a constant.

For example, the number $n_P$ of potential APs may include APs, which are selected after a clustering, a grouping, and/or any other kind of sorting and/or processing of the detected APs. In one example, the $n_P$ potential APs may include the $n_R$ cluster-representative APs, for example, if clustering is performed. In another example, the $n_P$ potential APs may include the $n_D$ detected APs.

For example, K may include any positive integer number, e.g., greater than or equal to one. For example, K may be added to increase possibilities of selecting the $n_S$ selected APs from the $n_C$ candidate APs, e.g., as described below.

In some demonstrative embodiments, location estimator 126 may select the $n_C$ candidate APs based on one or more criteria, e.g., as described below.

In some demonstrative embodiments, location estimator 126 may select the candidate APs to include a majority of APs belonging to the group of the same floor as mobile device 120, and several APs belonging to the other groups.

In some demonstrative embodiments, location estimator 126 may select the $n_C$ candidate APs from the prioritized $n_P$ potential APs.

In one example, location estimator 126 may select the $n_C$ candidate APs based on the distances between mobile device 120 and the candidate APs.

In another example, location estimator 126 may select the $n_C$ candidate APs based on the strongest RSSI.

In another example, location estimator 126 may select the $n_C$ candidate APs based on any other criteria.

In some demonstrative embodiments, location estimator 126 may determine a plurality of different AP combinations, e.g., as described below.

In some demonstrative embodiments, each AP combination may include a different combination of $n_S$ APs selected from the $n_C$ candidate APs.

In some demonstrative embodiments, the plurality of AP combinations may include all possible combinations of selecting the $n_S$ APs from the $n_C$ candidate APs, such that an order of a selection does not matter.

For example, the plurality of AP combinations may include a number, denoted $n_{Comb}$, of AP combinations, e.g., wherein:

$$n_{Comb} = \binom{n_C}{n_S} = \frac{n_C!}{n_S!(n_C - n_S)!} \quad (2)$$

In other embodiments, the plurality of AP combinations may include only some of the possible combinations of selecting the $n_S$ APs from the $n_C$ candidate APs. For example, the plurality of AP combinations may include a number of AP combinations, which is less than the number $n_{Comb}$.

In some demonstrative embodiments, location estimator 126 may determine a plurality of grades corresponding to the plurality of AP combinations.

In one example, the plurality of grades may include penalty grades. For example, location estimator 126 may deduct points from an initial grade, e.g., from a hundred points. According to this example, location estimator 126 may penalize an AP combination, e.g., by deducting the points from the grade, and location estimator 126 may reward the AP combination, e.g., by not deducting the points from the grade, or adding the points to the grade.

In another example, the plurality of grades may include positive grades. For example, location estimator 126 may add points to the initial grade, e.g., zero points. According to this example, location estimator 126 may reward the AP combination, e.g., by adding the points to the grade, and location estimator 126 may penalize the AP combination, e.g., by not adding the points to the grade, or deducting the points from the grade.

In some demonstrative embodiments, location estimator 126 may determine a grade of the AP combination, e.g., based on a Dilution of Precision (DOP) criterion, a communication band, a number of frequency channels, and/or any other criterion, e.g., as described below.

In some demonstrative embodiments, location estimator 126 may determine the grade of the AP combination, e.g., based on the location of mobile device 120 relative to locations of one or more APs of the AP combination.

For example, location estimator 126 may highly penalize the AP combination, for example, if a majority of the APs of the AP combination is located within a predefined distance from mobile device 120, and on the same floor as mobile device 120.

In some demonstrative embodiments, location estimator 126 may determine the grade of the AP combination, e.g., based on a communication band of one or more APs of the AP combination.

In one example, APs operating in high frequency bands may provide improved ToF measurement results, e.g., compared to APs operating in low frequency bands. Accordingly, location estimator 126 may highly penalize the AP combination, for example, if the AP combination includes a majority of low-band supported APs.

In some demonstrative embodiments, location estimator 126 may determine the grade of the AP combination, e.g., based on the number of frequency channels to communicate with the APs of the AP combination.

In one example, an AP combination using a large number of frequency channels may involve the switching of radio 124 between the frequency channels and, as a result, the power consumption of mobile device 120 may increase. For example, location estimator 126 may highly penalize the AP combination, for example, if the AP combination includes APs communicating over a large number of different frequency channels.

In some demonstrative embodiments, location estimator 126 may determine the grade of the AP combination, e.g., based on measurement failures stored in AP database 122.

For example, location estimator 126 may penalize the AP combination, for example, if the AP combination includes a large number of APs with a history of measurement failures.

In some demonstrative embodiments, location estimator 126 may determine the $n_S$ selected APs to include a selected combination from the plurality of AP combinations.

In some demonstrative embodiments, location estimator 126 may determine the selected combination, e.g., based on the plurality of grades.

In some demonstrative embodiments, location estimator 126 may determine the selected combination to include the least penalized AP combination.

In some demonstrative embodiments, location estimator 126 may estimate the location of mobile device 120, e.g., based on one or more measurements with the $n_S$ selected APs.

For example, the measurements may include ToF measurements, RSSI measurements, and/or any other measurements, e.g., ranging measurements.

In one example, the number $n_D$ of detected APs may be ten, the number $n_M$ of required APs may be four, the number $n_S$ of selected APs may be four, the constant K may be two, and the plurality of location areas may include three floors.

For example, mobile device 120 may detect AP 160, AP 162, AP 164, AP 166, AP 168, AP 170, AP 172, AP 174, AP 176, and/or AP 178.

For example, mobile device 120 may perform the clustering, and determine the number $n_R$ of cluster-representative APs to be eight.

For example, mobile device may determine AP 160, AP 162, AP 164, AP 166, AP 170, AP 172, AP 174, and/or AP 178 to be cluster-representatives.

For example, mobile device 120 may group the eight APs in three groups according to the affiliation of APs to the three different floors.

For example, mobile device 120 may group AP 160 and AP 162 to a group of the floor above mobile device 120; AP 164, AP 166, AP 170, AP 172, and AP 174 to a group of the same floor as mobile device 120; and AP 178 to a group of the floor beneath mobile device 120.

For example, mobile device 120 may prioritize AP 164, AP 166, AP 170, AP 172, and AP 174, e.g., based on the affiliation to the group of the same floor as mobile device 120.

In one example, mobile device 120 may prioritize AP 170 over AP 174, for example, if AP 170 is closer to mobile device 120.

In another example, mobile device 120 may prioritize AP 172 over AP 174, for example, if the RSSI of AP 172 is stronger than the RSSI of AP 174.

According to this example, the number $n_P$ of potential APs may be eight, and the number $n_C$ of candidate APs may include six APs.

For example, mobile device 120 may select AP 160, AP 162, AP 166, AP 170, AP 172, and/or AP 178 to be the $n_C$ candidate APs.

According to this example, mobile device 120 may select four selected APs out of the six candidate APs. According to this example, the number $n_{Comb}$ of the AP combinations may include fifteen combinations.

For example, mobile device 120 may select AP 160, AP 166, AP 170, and/or AP 178 to be the selected combination, for example, if a combination of AP 160, AP 166, AP 170, and/or AP 178 has a highest grade compared to the grades of all other combinations of the $n_C$ candidate APs.

For example, mobile device 120 may estimate the location of mobile device 120 based on the distances between mobile device 120 and AP 160, AP 166, AP 170, and/or AP 178.

Figure 2:
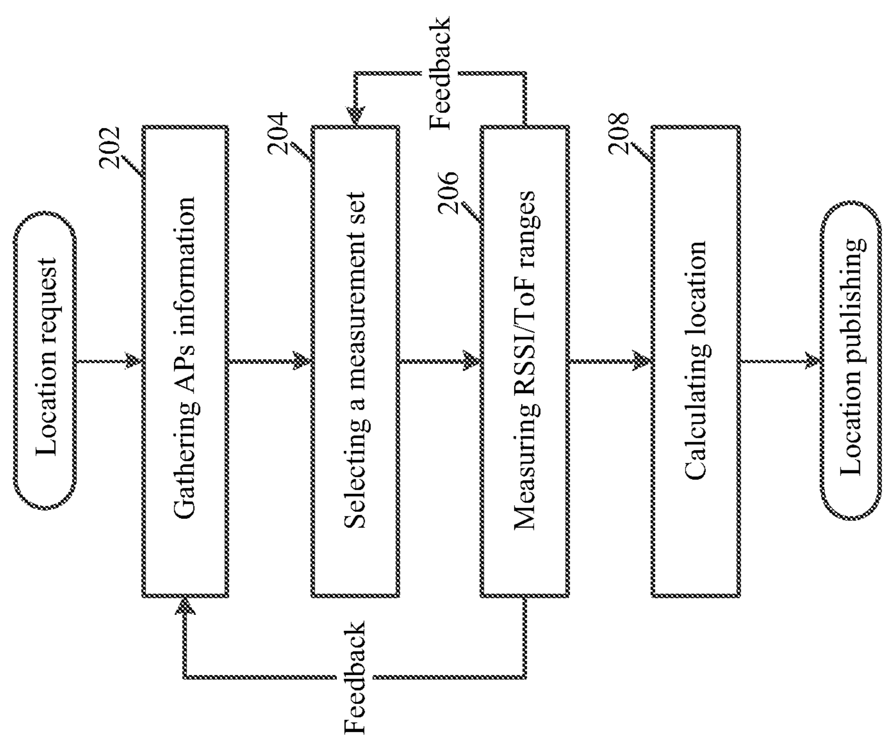
FIG. 2 is a schematic flow chart illustration of a method of estimating a location of a mobile device, in accordance with some demonstrative embodiments.

Reference is made to FIG. 2, which schematically illustrates a method of estimating a location of a mobile device, in accordance with some demonstrative embodiments. For example, one or more operations of the method of FIG. 2 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

As indicated at block 202, the method may include gathering AP information. For example, mobile device 120 (FIG. 1) may gather information from AP 160, AP 162, AP 164, AP 166, AP 168, AP 170, AP 172, AP 174, AP 176, and/or AP 178 (FIG. 1), e.g., as described below with reference to FIG. 3.

As indicated at block 204, the method may include selecting a measurement set of APs. For example, location estimator 126 (FIG. 1) may select the $n_S$ selected APs, e.g., as described below with reference to FIGS. 4, 5, 6, 7, and/or 8.

As indicated at block 206, the method may include measuring RSSI/ToF ranges with the selected APs. For example, location estimator 126 (FIG. 1) may measure RSSI/ToF ranges with the selected APs, e.g., as described above.

As indicated at block 208, the method may include calculating a location of the mobile device. For example, location estimator 126 (FIG. 1) may calculate the location of mobile device 120 (FIG. 1), e.g., as described above.

Figure 3:
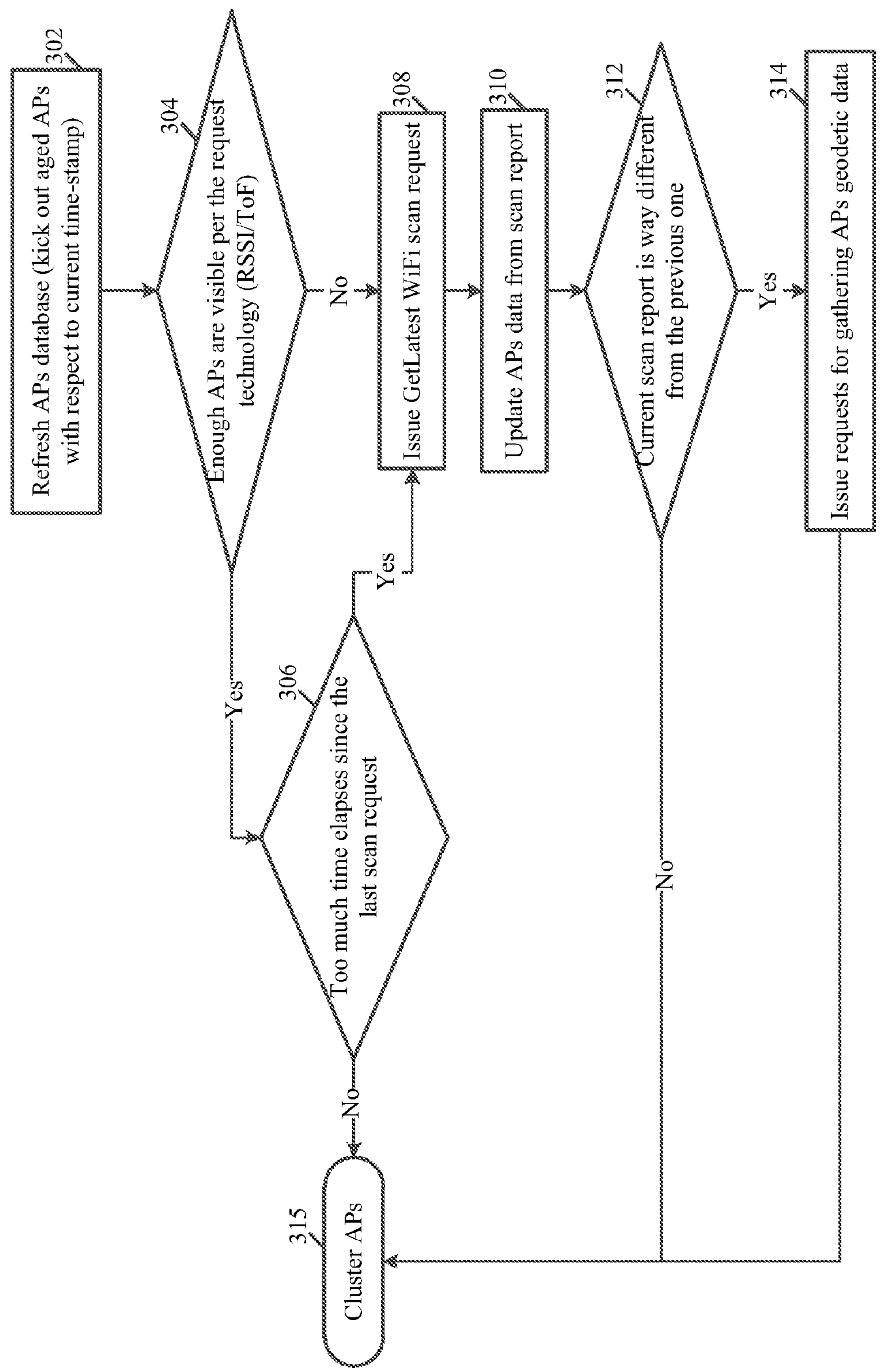
FIG. 3 is a schematic flow chart illustration of a method of gathering information corresponding to access points, in accordance with some demonstrative embodiments.

Reference is made to FIG. 3, which schematically illustrates a method of gathering information corresponding to access points, in accordance with some demonstrative embodiments. For example, one or more operations of the method of FIG. 3 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

In some demonstrative embodiments, one or more operations of the method of FIG. 3 may be performed as a part of a method of estimating a location of the mobile device, e.g., as described above with reference to block 202 (FIG. 2).

As indicated at block 302, the method may include refreshing an AP database with reference to a current time-stamp, e.g., by ignoring APs not detected during a recent wireless scanning. For example, location estimator 126 (FIG. 1) may refresh AP database 122 (FIG. 1) with reference to the current time-stamp, e.g., by ignoring the APs not detected during the recent wireless scanning, e.g., as described above.

As indicated at block 304, the method may include determining whether enough APs for estimating the location of the mobile device are detected per location estimation technology, e.g., RSSI, and/or ToF. For example, location estimator 126 (FIG. 1) may determine whether at least $n_M$ APs for estimating the location of mobile device 120 (FIG. 1) are detected per the location estimation technology, e.g., RSSI, and/or ToF.

As indicated at block 306, the method may include determining whether a time elapsed since a last wireless scanning is greater than a predefined time period, for example, if enough APs for estimating the location of the mobile device are detected. For example, location estimator 126 (FIG. 1) may determine whether the time elapsed since the last wireless scanning is greater than the predefined period, for example, if enough APs for estimating the location of mobile device 120 (FIG. 1) are detected.

As indicated at block 308, the method may include requesting for a latest wireless scanning report, for example, if the time elapsed since the last wireless scanning is greater than the predefined period, or not enough APs for estimating the location of the mobile device are detected. For example, location estimator 126 (FIG. 1) may request for the latest wireless scanning report, for example, if the time elapsed since the last wireless scanning is greater than the predefined period, or not enough APs for estimating the location of mobile device 120 (FIG. 1) are detected.

As indicated at block 310, the method may include updating the AP database, e.g., based on the latest wireless scanning report. For example, location estimator 126 (FIG. 1) may update AP database 122 (FIG. 1), e.g., based on the latest wireless scanning report.

As indicated at block 312, the method may include determining whether the latest wireless scanning report differs from a previous wireless scanning report. For example, location estimator 126 (FIG. 1) may determine whether the latest wireless scanning report differs from the previous wireless scanning report.

As indicated at block 314, the method may include requesting for APs geodetic data, for example, if the latest wireless scanning report differs from the previous wireless scanning report. For example, location estimator 126 (FIG. 1) may request server 130 (FIG. 1) for APs geodetic data, for example, if the latest wireless scanning report differs from the previous wireless scanning report.

As indicated at block 315, the method may include clustering APs, e.g., as described below with reference to FIG. 4.

Figure 4:
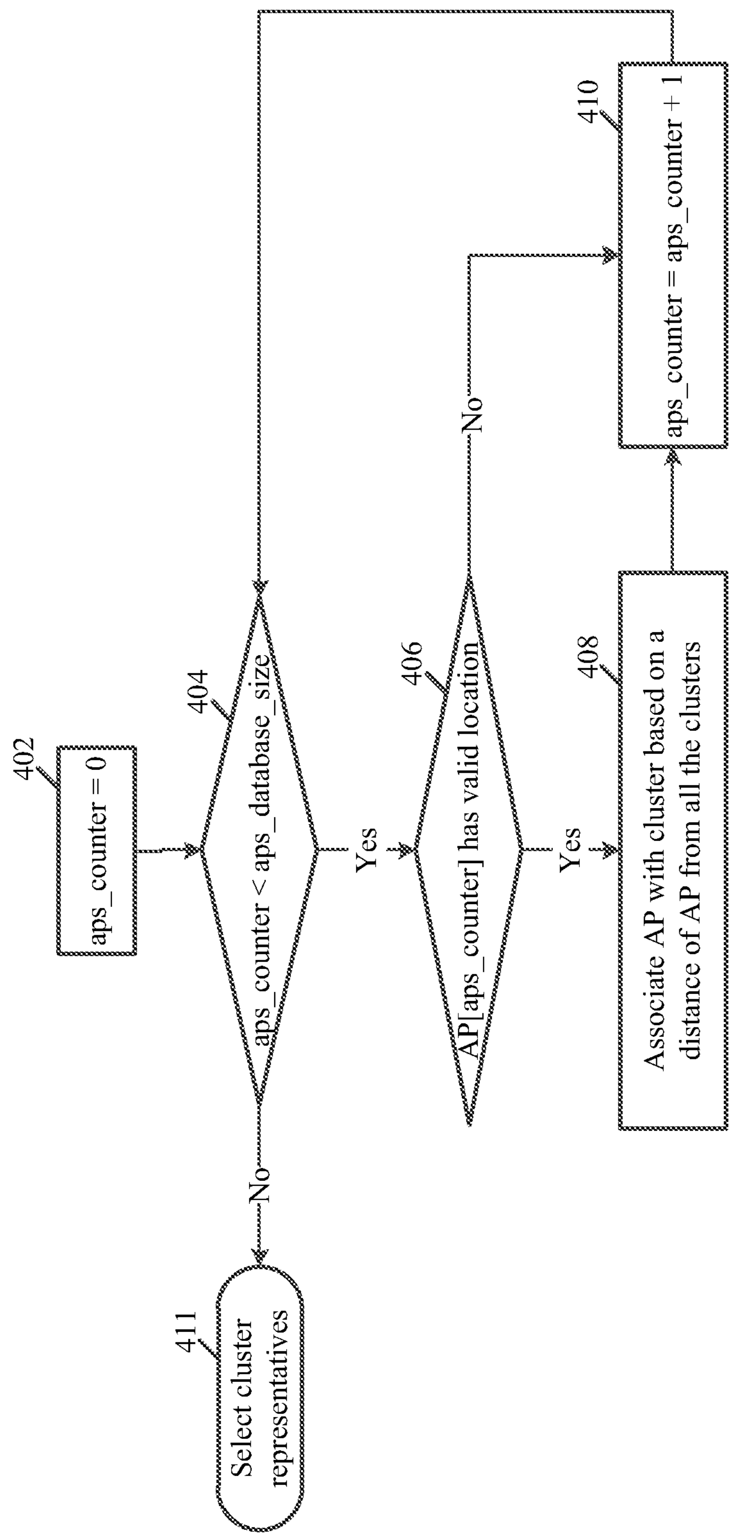
FIG. 4 is a schematic flow chart illustration of a method of clustering access points, in accordance with some demonstrative embodiments.

Reference is made to FIG. 4, which schematically illustrates a method of clustering access points, in accordance with some demonstrative embodiments. For example, one or more operations of the method of FIG. 4 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

In some demonstrative embodiments, one or more operations of the method of FIG. 4 may be performed as a part of a method of estimating a location of the mobile device, e.g., as described above with reference to block 315 (FIG. 3).

As indicated at block 402, the method may include resetting a counter ("aps_counter"), e.g., to zero.

As indicated at block 404, the method may include iterating over the plurality of APs, in accordance with a value of the counter. For example, location estimator 126 (FIG. 1) may iterate over the plurality of APs of AP database 122 (FIG. 1), in accordance with the value of the counter.

As indicated at block 406, the method may include determining whether an AP corresponding to the value of the counter provides a valid location. For example, location estimator 126 (FIG. 1) may determine whether the AP of AP database 122 (FIG. 1) corresponding to the value of the counter provides the valid location.

As indicated at block 408, the method may include associating the AP, corresponding to the value of the counter, with an AP cluster, e.g., based on a distance between the AP and the AP clusters, for example, if the AP provides the valid location. For example, location estimator 126 (FIG. 1) may associate the AP, corresponding to the value of the counter, with the AP cluster, e.g., based on the distance between the AP of AP database 122 (FIG. 1) and the AP clusters, for example, if the AP provides the valid location.

As indicated at block 410, the method may include increasing the counter by one to iterate over a subsequent AP of the plurality of APs. For example, location estimator 126 (FIG. 1) may repeat operations of blocks 404 to 410 with respect to a subsequent AP of AP database 122 (FIG. 1), for example, while the value of the counter is less than the number of the detected APs.

As indicated at block 411, the method may include selecting cluster representatives, e.g., as described below with reference to FIG. 5.

Figure 5:
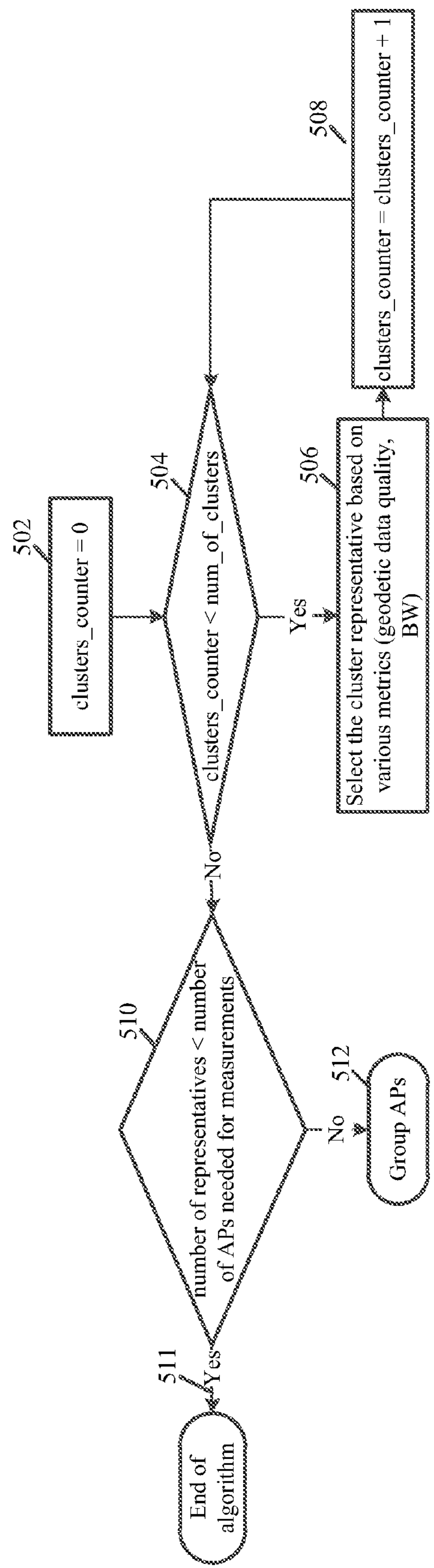
FIG. 5 is a schematic flow chart illustration of a method of selecting cluster representatives, in accordance with some demonstrative embodiments.

Reference is made to FIG. 5, which schematically illustrates a method of selecting cluster representatives of a plurality of AP clusters, in accordance with some demonstrative embodiments. For example, one or more operations of the method of FIG. 5 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

In some demonstrative embodiments, one or more operations of the method of FIG. 5 may be performed as a part of a method of estimating a location of the mobile device, e.g., as described above with reference to block 411 (FIG. 4).

As indicated at block 502, the method may include resetting a counter ("clusters_counter"), e.g., to zero.

As indicated at block 504, the method may include iterating over the plurality of AP clusters, in accordance with a value of the counter. For example, location estimator 126 (FIG. 1) may iterate over the plurality of AP clusters of AP database 122 (FIG. 1), in accordance with a value of the counter.

As indicated at block 506, the method may include selecting a cluster representative of an AP cluster corresponding to the value of the counter. For example, location estimator 126 (FIG. 1) may select the cluster representative of the AP cluster corresponding to the value of the counter.

As indicated at block 508, the method may include increasing the cluster counter by one to iterate over a subsequent AP cluster. For example, location estimator 126 (FIG. 1) may repeat operations of blocks 504 to 508 with respect to the subsequent AP cluster of AP database 122 (FIG. 1), for example, as long as the value of the counter is less than a number of AP clusters of AP database 122 (FIG. 1).

As indicated at block 510, the method may include determining whether a number of cluster representatives is less than a predefined number of APs for estimating the location of the mobile device. For example, location estimator 126 (FIG. 1) may determine whether the number of cluster representatives of AP database 122 (FIG. 1) is less than the number $n_M$.

As indicated by arrow 511, the method may include estimating the location of the mobile device using the cluster representatives, e.g., without further reducing the number of APs, for example, if the number of cluster representatives is less than the predefined number of APs for estimating the location of the mobile device. For example, location estimator 126 (FIG. 1) may estimate the location of mobile device 120 (FIG. 1), for example, if the number of cluster representatives of AP database 122 (FIG. 1) is less than the number $n_M$.

As indicated at block 512, the method may include grouping APs, e.g., as described below with reference to FIG. 6.

Figure 6:
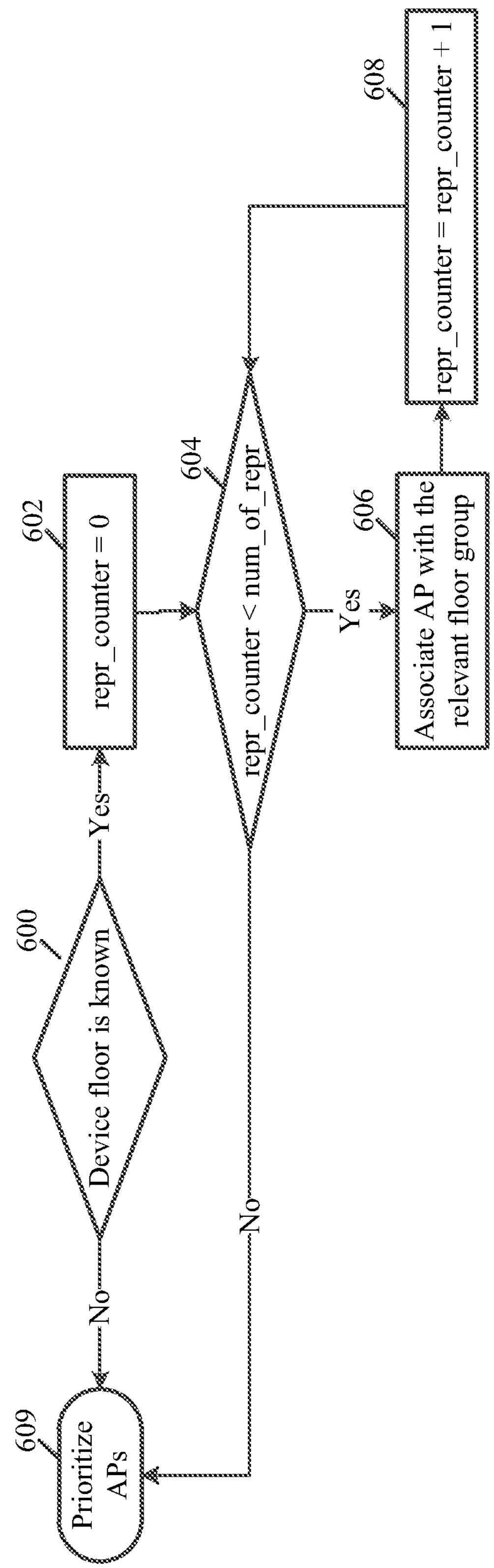
FIG. 6 is a schematic flow chart illustration of a method of grouping access points, in accordance with some demonstrative embodiments.

Reference is made to FIG. 6, which schematically illustrates a method of grouping access points, in accordance with some demonstrative embodiments. For example, one or more operations of the method of FIG. 6 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

In some demonstrative embodiments, one or more operations of the method of FIG. 6 may be performed as a part of a method of estimating a location of the mobile device, e.g., as described above with reference to block 512 (FIG. 5).

As indicated at block 600, the method may include determining whether a floor of the mobile device is known. For example, location estimator 126 (FIG. 1) may determine whether the floor of mobile device 120 (FIG. 1) is known.

As indicated at block 602, the method may include resetting a counter ("repr_counter"), e.g., to zero, for example, if the floor of the mobile device is known.

As indicated at block 604, the method may include iterating over the plurality of cluster representatives, in accordance with a value of the counter. For example, location estimator 126 (FIG. 1) may iterate over the plurality of cluster representatives of AP database 122 (FIG. 1), in accordance with the value of the counter.

As indicated at block 606, the method may include associating the AP corresponding to the value of the counter with a relevant floor group. For example, location estimator 126 (FIG. 1) may associate the AP of AP database 122 (FIG. 1) corresponding to the value of the counter with the relevant floor group.

As indicated at block 608, the method may include increasing the counter by one to iterate over a subsequent cluster representative of the plurality of cluster representatives. For example, location estimator 126 (FIG. 1) may repeat operations of blocks 604 to 608 with respect to the subsequent cluster representative of AP database 122 (FIG. 1), for example, while the value of the counter is less than the number of cluster representatives.

As indicated at block 609, the method may include prioritizing APs, e.g., as described below with reference to FIG. 7.

Figure 7:
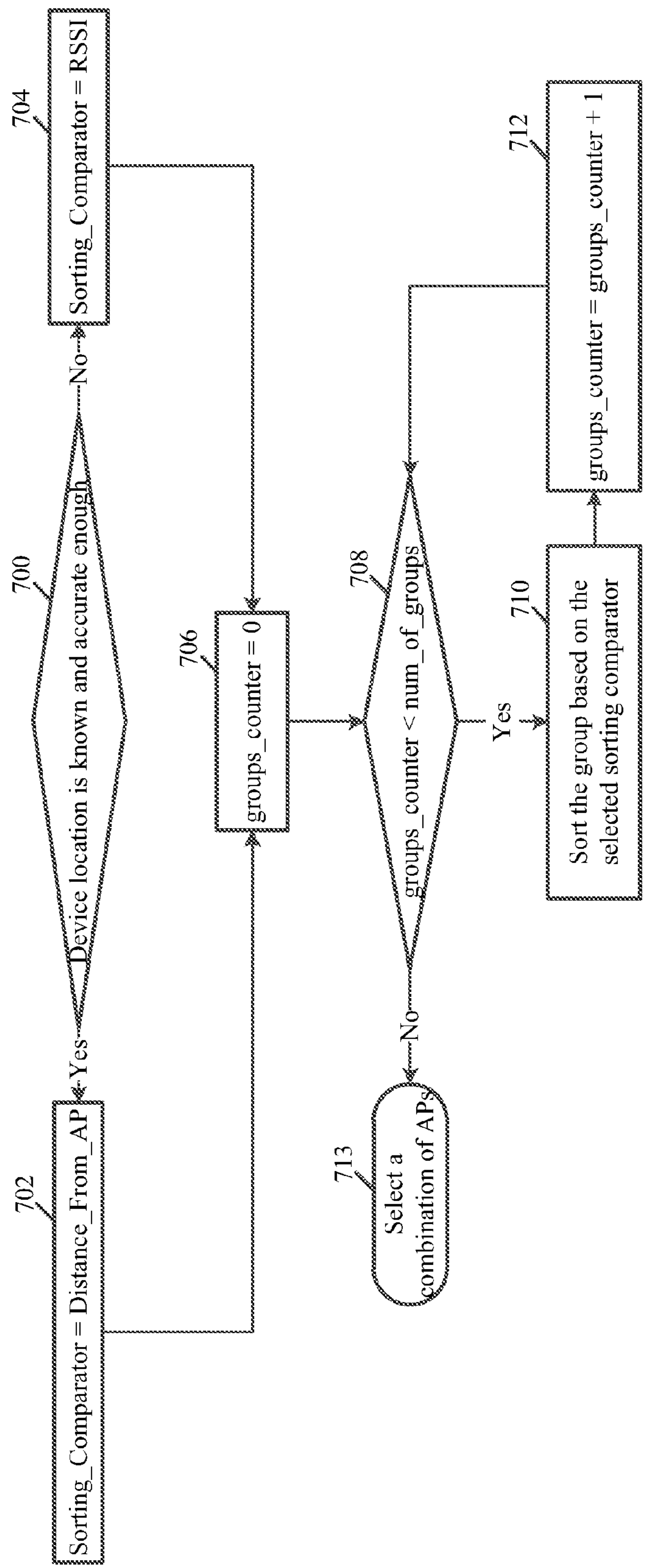
FIG. 7 is a schematic flow chart illustration of a method of prioritizing access points, in accordance with some demonstrative embodiments.

Reference is made to FIG. 7, which schematically illustrates a method of prioritizing access points, in accordance with some demonstrative embodiments. For example, one or more operations of the method of FIG. 7 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

In some demonstrative embodiments, one or more operations of the method of FIG. 7 may be performed as a part of a method of estimating a location of the mobile device, e.g., as described above with reference to block 609 (FIG. 6).

As indicated at block 700, the method may include determining whether a general location of the mobile device is known. For example, location estimator 126 (FIG. 1) may determine whether the general location of mobile device 120 (FIG. 1) is known.

As indicated at block 702, the method may include determining a prioritizing comparator ("sorting_comparator") to be a distance between the mobile device and an AP, for example, if the general location of the mobile device is known. For example, location estimator 126 (FIG. 1) may determine the prioritizing comparator to be the distance between mobile device 120 (FIG. 1) and the AP of AP database 122 (FIG. 1), for example, if the general location of mobile device 120 (FIG. 1) is known.

As indicated at block 704, the method may include determining the prioritizing comparator to be a RSSI of the AP, for example, if the general location of the mobile device is not known. For example, location estimator 126 (FIG. 1) may determine the prioritizing comparator to be the RSSI of the AP of AP database 122 (FIG. 1), for example, if the general location of mobile device 120 (FIG. 1) is not known.

As indicated at block 706, the method may include resetting a counter ("groups_counter"), e.g., to zero.

As indicated at block 708, the method may include iterating over a plurality of AP groups, in accordance with a value of the counter. For example, location estimator 126 (FIG. 1) may iterate over the plurality of AP groups of AP database 122 (FIG. 1), in accordance with the value of the counter.

As indicated at block 710, the method may include prioritizing an AP group corresponding to the value of the counter, e.g., based on the prioritizing comparator. For example, location estimator 126 (FIG. 1) may prioritize the AP group of AP database 122 (FIG. 1) corresponding to the value of the counter, e.g., based on the prioritizing comparator.

As indicated at block 712, the method may include increasing the counter by one, to iterate over a subsequent AP group of the plurality of AP groups. For example, location estimator 126 (FIG. 1) may repeat operations of blocks 708 to 712 with respect to the subsequent AP group of AP database 122 (FIG. 1), for example, while the value of the counter is less than the number of AP groups.

As indicated at block 713, the method may include selecting a combination of APs, e.g., as described below with reference to FIG. 8.

Figure 8:
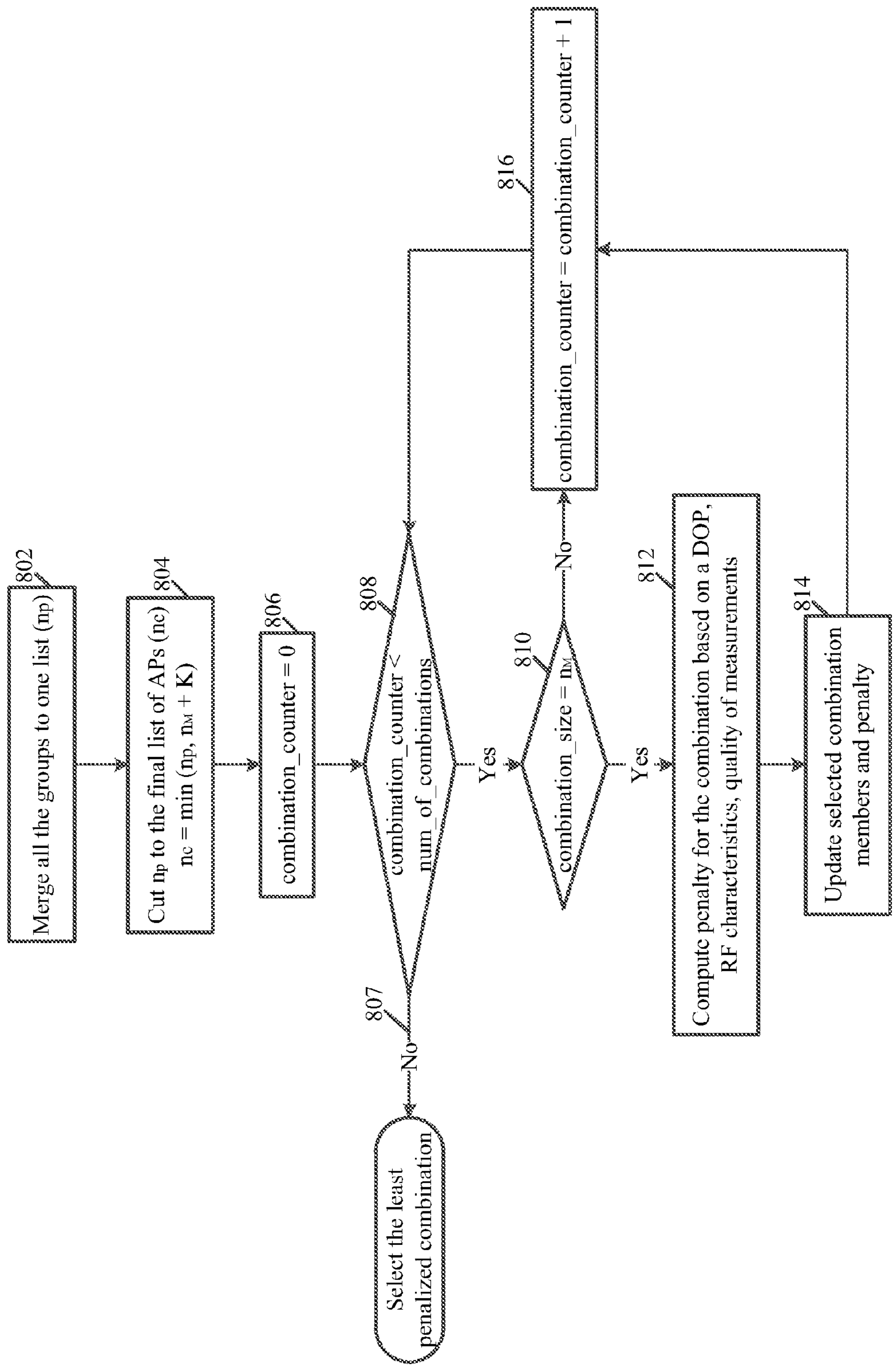
FIG. 8 is a schematic flow chart illustration of a method of selecting a combination of access points, in accordance with some demonstrative embodiments.

Reference is made to FIG. 8, which schematically illustrates a method of selecting a combination of access points, in accordance with some demonstrative embodiments. For example, one or more operations of the method of FIG. 8 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

In some demonstrative embodiments, one or more operations of the method of FIG. 8 may be performed as a part of a method of estimating a location of the mobile device, e.g., as described above with reference to block 713 (FIG. 7).

As indicated at block 802, the method may include merging a plurality of AP groups to $n_P$ potential APs. For example, location estimator 126 (FIG. 1) may merge the plurality of AP groups to the $n_P$ potential APs.

As indicated at block 804, the method may include reducing the $n_P$ potential APs to a plurality of candidate APs. For example, location estimator 126 (FIG. 1) may reduce the $n_P$ potential APs to the $n_C$ candidate APs, e.g., as described above.

As indicated at block 806, the method may include resetting a counter ("combination counter"), e.g., to zero.

As indicated at block 808, the method may include iterating over the plurality of AP combinations, in accordance with a value of the counter. For example, location estimator 126 (FIG. 1) may iterate over the plurality of AP combinations, in accordance with the value of the counter.

As indicated at block 810, the method may include determining whether a number of APs of an AP combination corresponding to the value of the counter is equal to the number $n_M$. For example, location estimator 126 (FIG. 1) may determine whether the number of APs of the AP combination of AP database 122 (FIG. 1) is equal to the number $n_M$.

As indicated at block 812, the method may include penalizing the AP combination corresponding to the value of the counter. For example, location estimator 126 (FIG. 1) may penalize the AP combination corresponding to the value of the counter, e.g., as described above.

As indicated at block 814, the method may include updating the AP combination, and a grade of the AP combination corresponding to the value of the counter. For example, location estimator 126 (FIG. 1) may update in AP database 122 (FIG. 1) the AP combination, and the grade of the AP combination corresponding to the value of the counter.

As indicated at block 816, the method may include increasing the counter by one to iterate over a subsequent AP combination of the plurality of AP combinations. For example, location estimator 126 (FIG. 1) may repeat operations of blocks 808 to 816 with respect to the subsequent AP combination of AP database 122 (FIG. 1), for example, while the value of the counter is less than the number of AP combinations.

As indicated by arrow 807, the method may include selecting a least penalized AP combination, for example, if iteration over the plurality of AP combinations is complete. For example, location estimator 126 (FIG. 1) may select the least penalized AP combination of AP database 122 (FIG. 1), for example, if the iteration over the plurality of AP combinations is complete.

Figure 9:
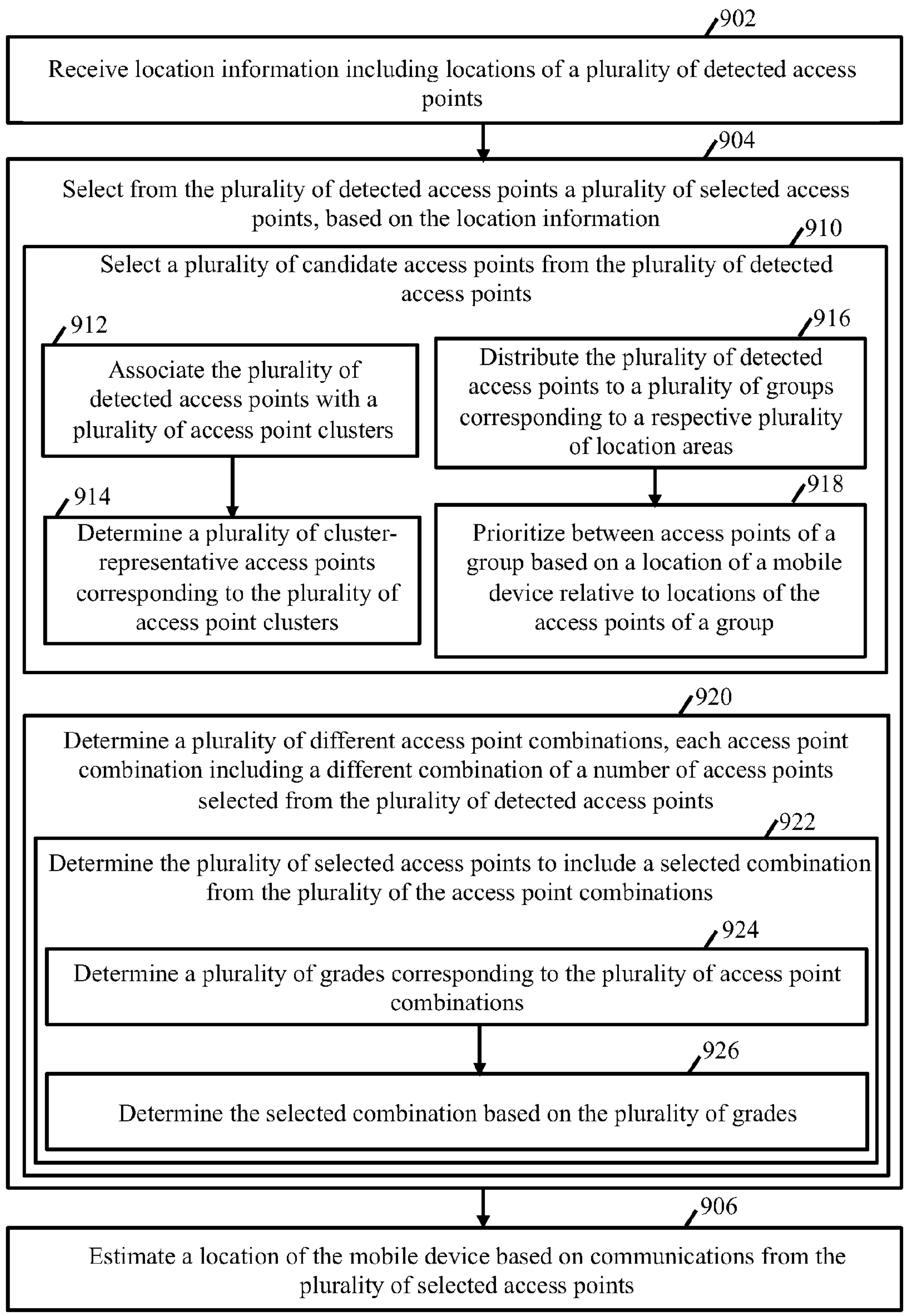
FIG. 9 is a schematic flow chart illustration of a method of estimating a location of a mobile device, in accordance with some demonstrative embodiments.

Reference is now made to FIG. 9, which schematically illustrates a method of estimating a location of a mobile device, in accordance with some demonstrative embodiments. For example, one or more operations of the method of FIG. 9 may be performed by a system, e.g., system 100 (FIG. 1), a mobile device, e.g., mobile device 120 (FIG. 1), an AP, e.g., AP 160, AP 162, AP 164, AP 166, AP 168, AP 170, AP 172, AP 174, AP 176, and/or AP 178 (FIG. 1), a location estimator, e.g., location estimator 126 (FIG. 1), and/or a radio, e.g., radio 124 (FIG. 1).

As indicated at block 902, the method may include receiving location information including locations of a plurality of detected APs. For example, radio 124 (FIG. 1) may receive location information including locations of AP 160, AP 162, AP 164, AP 166, AP 168, AP 170, AP 172, AP 174, AP 176, and/or AP 178 (FIG. 1), e.g., as described above.

As indicated at block 904, the method may include selecting from the plurality of detected APs a plurality of selected APs, e.g., based on the location information. For example, location estimator 126 (FIG. 1) may select from AP 160, AP 162, AP 164, AP 166, AP 168, AP 170, AP 172, AP 174, AP 176, and/or AP 178 (FIG. 1) the plurality of selected APs based on the location information, e.g., as described above.

As indicated at block 910, the method may include selecting a plurality of candidate APs from the plurality of detected APs. For example, location estimator 126 (FIG. 1) may select the plurality of candidate APs from AP 160, AP 162, AP 164, AP 166, AP 168, AP 170, AP 172, AP 174, AP 176, and/or AP 178 (FIG. 1), e.g., as described above.

As indicated at block 912, the method may include associating the plurality of detected APs with a plurality of AP clusters. For example, location estimator 126 (FIG. 1) may associate AP 160, AP 162, AP 164, AP 166, AP 168, AP 170, AP 172, AP 174, AP 176, and/or AP 178 (FIG. 1) with the plurality of AP clusters, e.g., as described above.

As indicated at block 914, the method may include determining a plurality of cluster-representative APs corresponding to the plurality of AP clusters. For example, location estimator 126 (FIG. 1) may determine the plurality of cluster-representative APs corresponding to the plurality of AP clusters, e.g., as described above.

As indicated at block 916, the method may include distributing the plurality of detected APs to a plurality of groups corresponding to a respective plurality of location areas. For example, location estimator 126 (FIG. 1) may distribute AP 160, AP 162, AP 164, AP 166, AP 168, AP 170, AP 172, AP 174, AP 176, and/or AP 178 (FIG. 1) to the plurality of groups corresponding to the respective plurality of location areas, e.g., as described above.

As indicated at block 918, the method may include prioritizing between APs of a group, e.g., based on a location of the mobile device relative to locations of the APs of the group. For example, location estimator 126 (FIG. 1) may prioritize between APs of the group, e.g., based on the location of mobile device 120 (FIG. 1) relative to locations of the APs of the group, e.g., as described above.

As indicated at block 920, the method may include determining a plurality of different AP combinations, each AP combination including a different combination of APs selected from the plurality of detected APs. For example, location estimator 126 (FIG. 1) may determine the plurality of different AP combinations, each AP combination including a different combination of APs selected from AP 160, AP 162, AP 164, AP 166, AP 168, AP 170, AP 172, AP 174, AP 176, and/or AP 178 (FIG. 1), e.g., as described above.

As indicated at block 922, the method may include determining the plurality of selected APs to include a selected combination from the plurality of the AP combinations. For example, location estimator 126 (FIG. 1) may determine the plurality of selected APs to include the selected combination from the plurality of the AP combinations, e.g., as described above.

As indicated at block 924, the method may include determining a plurality of grades corresponding to the plurality of AP combinations. For example, location estimator 126 (FIG. 1) may determine the plurality of grades corresponding to the plurality of AP combinations, e.g., as described above.

As indicated at block 926, the method may include determining the selected combination based on the plurality of grades. For example, location estimator 126 (FIG. 1) may determine the selected combination based on the plurality of grades, e.g., as described above.

As indicated at block 906, the method may include estimating the location of the mobile device, e.g., based on communications from the plurality of selected APs. For example, location estimator 126 (FIG. 1) may estimate the location of mobile device 120 (FIG. 1), e.g., based on communications from the plurality of selected APs, e.g., as described above.

Figure 10:
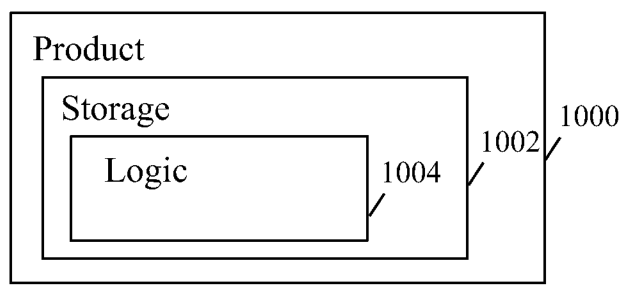
FIG. 10 is a schematic illustration of a product of manufacture, in accordance with some demonstrative embodiments.

Reference now is made to FIG. 10, which schematically illustrates a product of manufacture 1000, in accordance with some demonstrative embodiments. Product 1000 may include one or more tangible computer-readable non-transitory storage media 1002 to store logic 1004, which may be used, for example, to control and/or to perform at least part of the functionality of mobile device 120 (FIG. 1), location estimator 126 (FIG. 1), radio 124 (FIG. 1), receiver 116 (FIG. 1), transmitter 118 (FIG. 1), and/or to perform one or more operations of the method of FIGS. 2, 3, 4, 5, 6, 7, 8, and/or 9. The phrase "non-transitory machine-readable medium" is directed to include all computer-readable media, with the sole exception being a transitory propagating signal.

In some demonstrative embodiments, product 1000 and/or media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a mobile device comprising a radio to receive location information including locations of a plurality of detected access points; and a location estimator to select from the plurality of detected access points a plurality of selected access points, based on the location information, and to estimate a location of the mobile device based on communications from the plurality of selected access points.

Example 2 includes the subject matter of Example 1, and optionally, wherein the plurality of selected access points includes a first number of access points, the location estimator to select a plurality of candidate access points from the plurality of detected access points, the plurality of candidate access points including a second number of access points, the second number being greater than the first number, the location estimator to select the plurality of selected access points from the plurality of candidate access points.

Example 3 includes the subject matter of Example 1 or 2, and optionally, wherein the location estimator is to determine a plurality of different access point combinations, each access point combination including a different combination of the first number of access points selected from the plurality of detected access points, the location estimator to determine the plurality of selected access points to include a selected combination from the plurality of the access point combinations.

Example 4 includes the subject matter of Example 3, and optionally, wherein the location estimator is to determine a plurality of grades corresponding to the plurality of access point combinations, and to determine the selected combination based on the plurality of grades.

Example 5 includes the subject matter of Example 4, and optionally, wherein the location estimator is to determine a grade of the access point combination based on a location of the mobile device relative to locations of one or more access points of the access point combination.

Example 6 includes the subject matter of Example 4 or 5, and optionally, wherein the location estimator is to determine a grade of the access point combination based on a communication band of one or more access points of the access point combination.

Example 7 includes the subject matter of any one of Examples 4-6, and optionally, wherein the location estimator is to determine a grade of the access point combination based on a number of frequency channels to communicate with the access points of the access point combination.

Example 8 includes the subject matter of any one of Examples 1-7, and optionally, wherein the location estimator is to associate the plurality of detected access points with a plurality of access point clusters, to determine a plurality of cluster-representative access points corresponding to the plurality of access point clusters, and to select the plurality of selected access points from the plurality of cluster-representative access points.

Example 9 includes the subject matter of Example 8, and optionally, wherein the location estimator is to associate a detected access point with an access point cluster based on an address of the detected access point, or a location of the detected access point.

Example 10 includes the subject matter of any one of Examples 1-9, and optionally, wherein the location estimator is to distribute the plurality of detected access points to a plurality of groups corresponding to a respective plurality of location areas, and to select the plurality of selected access points based on the plurality of groups.

Example 11 includes the subject matter of Example 10, and optionally, wherein the plurality of location areas comprises a plurality of floors of an indoor area.

Example 12 includes the subject matter of Example 10 or 11, and optionally, wherein the location estimator is to prioritize between access points of a group based on a location of the mobile device relative to locations of the access points of the group.

Example 13 includes the subject matter of any one of Examples 10-12, and optionally, wherein the location estimator is to prioritize between access points of a group based on a received signal strength from the access points of the group.

Example 14 includes the subject matter of any one of Examples 1-13, and optionally, wherein the location estimator is to estimate the location of the mobile device based on one or more measurements selected from the group consisting of Time of Flight (ToF) measurement with the plurality of selected access points, and Received Signal Strength Indication (RSSI) measurements.

Example 15 includes the subject matter of any one of Examples 1-14, and optionally, comprising one or more antennas, a memory and a processor.

Example 16 includes a wireless communication system comprising a mobile device, the mobile device comprising one or more antennas; a memory; a processor; a radio to receive location information including locations of a plurality of detected access points; and a location estimator to select from the plurality of detected access points a plurality of selected access points, based on the location information, and to estimate a location of the mobile device based on communications from the plurality of selected access points.

Example 17 includes the subject matter of Example 16, and optionally, wherein the plurality of selected access points includes a first number of access points, the location estimator to select a plurality of candidate access points from the plurality of detected access points, the plurality of candidate access points including a second number of access points, the second number being greater than the first number, the location estimator to select the plurality of selected access points from the plurality of candidate access points.

Example 18 includes the subject matter of Example 16 or 17, and optionally, wherein the location estimator is to determine a plurality of different access point combinations, each access point combination including a different combination of the first number of access points selected from the plurality of detected access points, the location estimator to determine the plurality of selected access points to include a selected combination from the plurality of the access point combinations.

Example 19 includes the subject matter of Example 18, and optionally, wherein the location estimator is to determine a plurality of grades corresponding to the plurality of access point combinations, and to determine the selected combination based on the plurality of grades.

Example 20 includes the subject matter of Example 19, and optionally, wherein the location estimator is to determine a grade of the access point combination based on a location of the mobile device relative to locations of one or more access points of the access point combination.

Example 21 includes the subject matter of Example 19 or 20, and optionally, wherein the location estimator is to determine a grade of the access point combination based on a communication band of one or more access points of the access point combination.

Example 22 includes the subject matter of any one of Examples 19-21, and optionally, wherein the location estimator is to determine a grade of the access point combination based on a number of frequency channels to communicate with the access points of the access point combination.

Example 23 includes the subject matter of any one of Examples 16-22, and optionally, wherein the location estimator is to associate the plurality of detected access points with a plurality of access point clusters, to determine a plurality of cluster-representative access points corresponding to the plurality of access point clusters, and to select the plurality of selected access points from the plurality of cluster-representative access points.

Example 24 includes the subject matter of Example 23, and optionally, wherein the location estimator is to associate a detected access point with an access point cluster based on an address of the detected access point, or a location of the detected access point.

Example 25 includes the subject matter of any one of Examples 16-24, and optionally, wherein the location estimator is to distribute the plurality of detected access points to a plurality of groups corresponding to a respective plurality of location areas, and to select the plurality of selected access points based on the plurality of groups.

Example 26 includes the subject matter of Example 25, and optionally, wherein the plurality of location areas comprises a plurality of floors of an indoor area.

Example 27 includes the subject matter of Example 25 or 26, and optionally, wherein the location estimator is to prioritize between access points of a group based on a location of the mobile device relative to locations of the access points of the group.

Example 28 includes the subject matter of any one of Examples 25-27, and optionally, wherein the location estimator is to prioritize between access points of a group based on a received signal strength from the access points of the group.

Example 29 includes the subject matter of any one of Examples 16-28, and optionally, wherein the location estimator is to estimate the location of the mobile device based on one or more measurements selected from the group consisting of Time of Flight (ToF) measurement with the plurality of selected access points, and Received Signal Strength Indication (RSSI) measurements.

Example 30 includes a method to be performed by a mobile device, the method comprising receiving location information including locations of a plurality of detected access points; selecting from the plurality of detected access points a plurality of selected access points, based on the location information; and estimating a location of the mobile device based on communications from the plurality of selected access points.

Example 31 includes the subject matter of Example 30, and optionally, wherein the plurality of selected access points includes a first number of access points, the method comprising selecting a plurality of candidate access points from the plurality of detected access points, the plurality of candidate access points including a second number of access points, the second number being greater than the first number, and selecting the plurality of selected access points from the plurality of candidate access points.

Example 32 includes the subject matter of Example 30 or 31, and optionally, comprising determining a plurality of different access point combinations, each access point combination including a different combination of the first number of access points selected from the plurality of detected access points, and determining the plurality of selected access points to include a selected combination from the plurality of the access point combinations.

Example 33 includes the subject matter of Example 32 comprising determining a plurality of grades corresponding to the plurality of access point combinations, and determining the selected combination based on the plurality of grades.

Example 34 includes the subject matter of Example 33, and optionally, comprising determining a grade of the access point combination based on a location of the mobile device relative to locations of one or more access points of the access point combination.

Example 35 includes the subject matter of Example 33 or 34, and optionally, comprising determining a grade of the access point combination based on a communication band of one or more access points of the access point combination.

Example 36 includes the subject matter of any one of Examples 33-35, and optionally, comprising determining a grade of the access point combination based on a number of frequency channels to communicate with the access points of the access point combination.

Example 37 includes the subject matter of any one of Examples 30-36, and optionally, comprising associating the plurality of detected access points with a plurality of access point clusters, determining a plurality of cluster-representative access points corresponding to the plurality of access point clusters, and selecting the plurality of selected access points from the plurality of cluster-representative access points.

Example 38 includes the subject matter of Example 37, and optionally, comprising associating a detected access point with an access point cluster based on an address of the detected access point, or a location of the detected access point.

Example 39 includes the subject matter of any one of Examples 30-38, and optionally, comprising distributing the plurality of detected access points to a plurality of groups corresponding to a respective plurality of location areas, and selecting the plurality of selected access points based on the plurality of groups.

Example 40 includes the subject matter of Example 39, and optionally, wherein the plurality of location areas comprises a plurality of floors of an indoor area.

Example 41 includes the subject matter of Example 39 or 40, and optionally, comprising prioritizing between access points of a group based on a location of the mobile device relative to locations of the access points of the group.

Example 42 includes the subject matter of any one of Examples 39-41, and optionally, comprising prioritizing between access points of a group based on a received signal strength from the access points of the group.

Example 43 includes the subject matter of any one of Examples 30-42, and optionally, comprising estimating the location of the mobile device based on one or more measurements selected from the group consisting of Time of Flight (ToF) measurement with the plurality of selected access points, and Received Signal Strength Indication (RSSI) measurements.

Example 44 includes a product including one or more tangible computer-readable non-transitory storage media comprising computer-executable instructions operable to, when executed by at least one computer processor, enable the at least one computer processor to implement a method at a mobile device, the method comprising receiving location information including locations of a plurality of detected access points; selecting from the plurality of detected access points a plurality of selected access points, based on the location information; and estimating a location of the mobile device based on communications from the plurality of selected access points.

Example 45 includes the subject matter of Example 44, and optionally, wherein the plurality of selected access points includes a first number of access points, the method comprises selecting a plurality of candidate access points from the plurality of detected access points, the plurality of candidate access points including a second number of access points, the second number being greater than the first number, and selecting the plurality of selected access points from the plurality of candidate access points.

Example 46 includes the subject matter of Example 44 or 45, and optionally, wherein the method comprises determining a plurality of different access point combinations, each access point combination including a different combination of the first number of access points selected from the plurality of detected access points, and determining the plurality of selected access points to include a selected combination from the plurality of the access point combinations.

Example 47 includes the subject matter of Example 46, and optionally, wherein the method comprises determining a plurality of grades corresponding to the plurality of access point combinations, and determining the selected combination based on the plurality of grades.

Example 48 includes the subject matter of Example 47, and optionally, wherein the method comprises determining a grade of the access point combination based on a location of the mobile device relative to locations of one or more access points of the access point combination.

Example 49 includes the subject matter of Example 47 or 48, and optionally, wherein the method comprises determining a grade of the access point combination based on a communication band of one or more access points of the access point combination.

Example 50 includes the subject matter of any one of Examples 47-49, and optionally, wherein the method comprises determining a grade of the access point combination based on a number of frequency channels to communicate with the access points of the access point combination.

Example 51 includes the subject matter of any one of Examples 44-50, and optionally, wherein the method comprises associating the plurality of detected access points with a plurality of access point clusters, determining a plurality of cluster-representative access points corresponding to the plurality of access point clusters, and selecting the plurality of selected access points from the plurality of cluster-representative access points.

Example 52 includes the subject matter of Example 51, and optionally, wherein the method comprises associating a detected access point with an access point cluster based on an address of the detected access point, or a location of the detected access point.

Example 53 includes the subject matter of any one of Examples 44-52, and optionally, wherein the method comprises distributing the plurality of detected access points to a plurality of groups corresponding to a respective plurality of location areas, and selecting the plurality of selected access points based on the plurality of groups.

Example 54 includes the subject matter of Example 53, and optionally, wherein the plurality of location areas comprises a plurality of floors of an indoor area.

Example 55 includes the subject matter of Example 53 or 54, and optionally, wherein the method comprises prioritizing between access points of a group based on a location of the mobile device relative to locations of the access points of the group.

Example 56 includes the subject matter of any one of Examples 53-55, and optionally, wherein the method comprises prioritizing between access points of a group based on a received signal strength from the access points of the group.

Example 57 includes the subject matter of any one of Examples 44-56, and optionally, wherein the method comprises estimating the location of the mobile device based on one or more measurements selected from the group consisting of Time of Flight (ToF) measurement with the plurality of selected access points, and Received Signal Strength Indication (RSSI) measurements.

Example 58 includes an apparatus comprising means for receiving at a mobile device location information including locations of a plurality of detected access points; means for selecting from the plurality of detected access points a plurality of selected access points, based on the location information; and means for estimating a location of the mobile device based on communications from the plurality of selected access points.

Example 59 includes the subject matter of Example 58, and optionally, wherein the plurality of selected access points includes a first number of access points, the apparatus comprising means for selecting a plurality of candidate access points from the plurality of detected access points, the plurality of candidate access points including a second number of access points, the second number being greater than the first number, and selecting the plurality of selected access points from the plurality of candidate access points.

Example 60 includes the subject matter of Example 58 or 59, and optionally, comprising means for determining a plurality of different access point combinations, each access point combination including a different combination of the first number of access points selected from the plurality of detected access points, and determining the plurality of selected access points to include a selected combination from the plurality of the access point combinations.

Example 61 includes the subject matter of Example 60, and optionally, comprising means for determining a plurality of grades corresponding to the plurality of access point combinations, and determining the selected combination based on the plurality of grades.

Example 62 includes the subject matter of Example 61, and optionally, comprising means for determining a grade of the access point combination based on a location of the mobile device relative to locations of one or more access points of the access point combination.

Example 63 includes the subject matter of Example 61 or 62, and optionally, comprising means for determining a grade of the access point combination based on a communication band of one or more access points of the access point combination.

Example 64 includes the subject matter of any one of Examples 61-63, and optionally, comprising means for determining a grade of the access point combination based on a number of frequency channels to communicate with the access points of the access point combination.

Example 65 includes the subject matter of any one of Examples 58-64, and optionally, comprising means for associating the plurality of detected access points with a plurality of access point clusters, determining a plurality of cluster-representative access points corresponding to the plurality of access point clusters, and selecting the plurality of selected access points from the plurality of cluster-representative access points.

Example 66 includes the subject matter of Example 65, and optionally, comprising means for associating a detected access point with an access point cluster based on an address of the detected access point, or a location of the detected access point.

Example 67 includes the subject matter of any one of Examples 58-66, and optionally, comprising means for distributing the plurality of detected access points to a plurality of groups corresponding to a respective plurality of location areas, and selecting the plurality of selected access points based on the plurality of groups.

Example 68 includes the subject matter of Example 67, and optionally, wherein the plurality of location areas comprises a plurality of floors of an indoor area.

Example 69 includes the subject matter of Example 67 or 68, and optionally, comprising means for prioritizing between access points of a group based on a location of the mobile device relative to locations of the access points of the group.

Example 70 includes the subject matter of any one of Examples 67-69, and optionally, comprising means for prioritizing between access points of a group based on a received signal strength from the access points of the group.

Example 71 includes the subject matter of any one of Examples 58-70, and optionally, comprising means for estimating the location of the mobile device based on one or more measurements selected from the group consisting of Time of Flight (ToF) measurement with the plurality of selected access points, and Received Signal Strength Indication (RSSI) measurements.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A mobile device comprising:

a radio to receive location information including locations of a plurality of detected access points; and a location estimator to select from said plurality of detected access points a plurality of selected access points, based on the location information, and to estimate a location of said mobile device based on communications from the plurality of selected access points, said location estimator to determine a plurality of different access point combinations including a respective plurality of different combinations of two or more access points of the plurality of detected access points, said location estimator to determine a plurality of grades corresponding to the plurality of access point combinations, and, based on the plurality of grades, to determine the plurality of selected access points to include a selected combination from the plurality of access point combinations, said location estimator to determine a first grade corresponding to a first access point combination comprising access points communicating over a first number of different frequency channels, and to determine a second grade, which is prioritized to the first grade, corresponding to a second access point combination comprising access points communicating over a second number of different frequency channels, which is less than the first number of frequency channels.

2. The mobile device of claim 1, wherein said location estimator is to select a plurality of candidate access points from said plurality of detected access points, and to select the plurality of selected access points from the plurality of candidate access points.

3. The mobile device of claim 1, wherein said location estimator is to determine for an access point combination comprising access points located on a same floor as the mobile device a grade, which is prioritized to a grade of an access point combination comprising one or more access points located on a different floor from the mobile device.

4. The mobile device of claim 1, wherein said location estimator is to determine a grade of an access point combination of the plurality of access point combinations based on a location of the mobile device relative to locations of one or more access points of the access point combination.

5. The mobile device of claim 1, wherein said location estimator is to determine a grade of an access point combination of the plurality of access point combinations based on a communication band of one or more access points of the access point combination.

6. The mobile device of claim 1, wherein said location estimator is to determine for an access point combination comprising access points operating in a first frequency band a grade, which is prioritized to a grade of an access point combination comprising access points operating in a second frequency band, which is lower than the first frequency band.

7. The mobile device of claim 1, wherein said location estimator is to associate said plurality of detected access points with a plurality of access point clusters, to determine a plurality of cluster-representative access points corresponding to said plurality of access point clusters, and to select the plurality of selected access points from said plurality of cluster-representative access points.

8. The mobile device of claim 7, wherein said location estimator is to associate a detected access point with an access point cluster based on an address of the detected access point, or a location of the detected access point.

9. The mobile device of claim 1, wherein said location estimator is to distribute the plurality of detected access points to a plurality of groups corresponding to a respective plurality of location areas, and to select the plurality of selected access points based on the plurality of groups.

10. The mobile device of claim 9, wherein said plurality of location areas comprises a plurality of floors of an indoor area.

11. The mobile device of claim 9, wherein said location estimator is to prioritize between access points of a group based on a location of the mobile device relative to locations of the access points of the group.

12. The mobile device of claim 9, wherein said location estimator is to prioritize between access points of a group based on a received signal strength from the access points of the group.

13. The mobile device of claim 1, wherein said location estimator is to estimate the location of the mobile device based on one or more measurements selected from the group consisting of Time of Flight (ToF) measurement with said plurality of selected access points, and Received Signal Strength Indication (RSSI) measurements.

14. A wireless communication system comprising a mobile device, the mobile device comprising:

one or more antennas;

a memory;

a processor;

a radio to receive location information including locations of a plurality of detected access points; and a location estimator to select from said plurality of detected access points a plurality of selected access points, based on the location information, and to estimate a location of said mobile device based on communications from the plurality of selected access points, said location estimator to determine a plurality of different access point combinations including a respective plurality of different combinations of two or more access points of the plurality of detected access points, said location estimator to determine a plurality of grades corresponding to the plurality of access point combinations, and, based on the plurality of grades, to determine the plurality of selected access points to include a selected combination from the plurality of access point combinations, said location estimator to determine a first grade corresponding to a first access point combination comprising access points communicating over a first number of different frequency channels, and to determine a second grade, which is prioritized to the first grade, corresponding to a second access point combination comprising access points communicating over a second number of different frequency channels, which is less than the first number of frequency channels.

15. The wireless communication system of claim 14, wherein said location estimator is to select a plurality of candidate access points from said plurality of detected access points, and to select the plurality of selected access points from the plurality of candidate access points.

16. The wireless communication system of claim 14, wherein said location estimator is to determine for an access point combination comprising access points located on a same floor as the mobile device a grade, which is prioritized to a grade of an access point combination comprising one or more access points located on a different floor from the mobile device.

17. A method to be performed by a mobile device, the method comprising:

receiving location information including locations of a plurality of detected access points;

selecting from said plurality of detected access points a plurality of selected access points, based on the location information, selecting the plurality of selected access points comprising:

determining a plurality of different access point combinations including a respective plurality of different combinations of two or more access points of the plurality of detected access points;

determining a plurality of grades corresponding to the plurality of access point combinations, determining the plurality of grades comprising determining a first grade corresponding to a first access point combination comprising access points communicating over a first number of different frequency channels, and determining a second grade, which is prioritized to the first grade, corresponding to a second access point combination comprising access points communicating over a second number of different frequency channels, which is less than the first number of frequency channels; and based on the plurality of grades, determining the plurality of selected access points to include a selected combination from the plurality of access point combinations; and estimating a location of said mobile device based on communications from the plurality of selected access points.

18. The method of claim 17 comprising selecting a plurality of candidate access points from said plurality of detected access points, and selecting the plurality of selected access points from the plurality of candidate access points.

19. The method of claim 17 comprising determining for an access point combination comprising access points located on a same floor as the mobile device a grade, which is prioritized to a grade of an access point combination comprising one or more access points located on a different floor from the mobile device.

20. A product comprising one or more tangible computer-readable non-transitory storage media comprising computer-executable instructions operable to, when executed by at least one computer processor, enable the at least one computer processor to implement operations at a mobile device, the operations comprising:

receiving location information including locations of a plurality of detected access points;

selecting from said plurality of detected access points a plurality of selected access points, based on the location information, selecting the plurality of selected access points comprising:

determining a plurality of different access point combinations including a respective plurality of different combinations of two or more access points of the plurality of detected access points;

determining a plurality of grades corresponding to the plurality of access point combinations, determining the plurality of grades comprising determining a first grade corresponding to a first access point combination comprising access points communicating over a first number of different frequency channels, and determining a second grade, which is prioritized to the first grade, corresponding to a second access point combination comprising access points communicating over a second number of different frequency channels, which is less than the first number of frequency channels; and based on the plurality of grades, determining the plurality of selected access points to include a selected combination from the plurality of access point combinations; and estimating a location of said mobile device based on communications from the plurality of selected access points.

21. The product of claim 20, wherein the operations comprise selecting a plurality of candidate access points from said plurality of detected access points, and selecting the plurality of selected access points from the plurality of candidate access points.

22. The product of claim 20, wherein the operations comprise determining for an access point combination comprising access points located on a same floor as the mobile device a grade, which is prioritized to a grade of an access point combination comprising one or more access points located on a different floor from the mobile device.

23. The product of claim 20, wherein the operations comprise associating said plurality of detected access points with a plurality of access point clusters, determining a plurality of cluster-representative access points corresponding to said plurality of access point clusters, and selecting the plurality of selected access points from said plurality of cluster-representative access points.

24. The product of claim 20, wherein the operations comprise distributing the plurality of detected access points to a plurality of groups corresponding to a respective plurality of location areas, and selecting the plurality of selected access points based on the plurality of groups.

* * * * *